United States Patent [19]
Veltkamp

[11] 3,770,210
[45] Nov. 6, 1973

[54] WATER SWEEP
[76] Inventor: Clarence W. Veltkamp, 4040 Willow Springs Rd., Central Point, Oreg. 97501
[22] Filed: Sept. 7, 1972
[21] Appl. No.: 286,891

[52] U.S. Cl.................. 239/532, 239/550, 239/566
[51] Int. Cl.......................... B05b 15/06, B05b 1/20
[58] Field of Search.................... 239/152, 154, 375, 239/525, 532, 548, 550, 566, 587, 147, 159

[56] References Cited
UNITED STATES PATENTS

| | | | |
|---|---|---|---|
| 2,911,157 | 11/1959 | Converse | 239/152 |
| 426,664 | 4/1890 | Douaboo | 239/147 |
| 3,542,593 | 11/1970 | Pribbernow | 239/532 |
| 3,565,347 | 2/1971 | Denninger et al. | 239/532 |
| 3,673,827 | 7/1972 | Hales | 239/532 |

FOREIGN PATENTS OR APPLICATIONS

| | | | |
|---|---|---|---|
| 1,160,989 | 8/1969 | Great Britain | 239/532 |
| 680,750 | 10/1952 | Great Britain | 239/550 |

Primary Examiner—Robert S. Ward, Jr.
Attorney—John N. Randolph

[57] ABSTRACT

A device for attachment to a conventional garden hose, which is supported on caster wheels, which is manually propelled and which includes a plurality of spray nozzles directed downwardly and forwardly for sweeping a surface over which the device is propelled for cleaning debris from the path traversed by the device. The caster wheels enable the manifold which carries the spray nozzles to be disposed at an angle to the direction of travel of the device for sweeping the debris to either side of the path over which the manifold travels.

6 Claims, 3 Drawing Figures

PATENTED NOV 6 1973 3,770,210
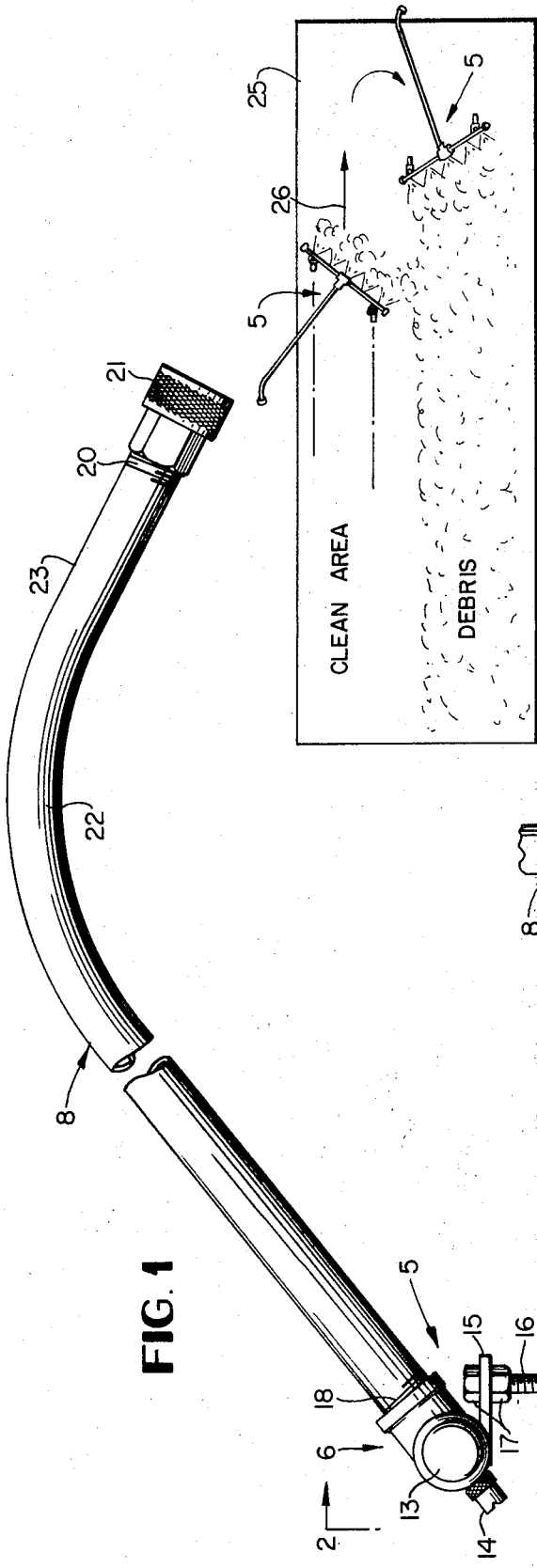
FIG. 1
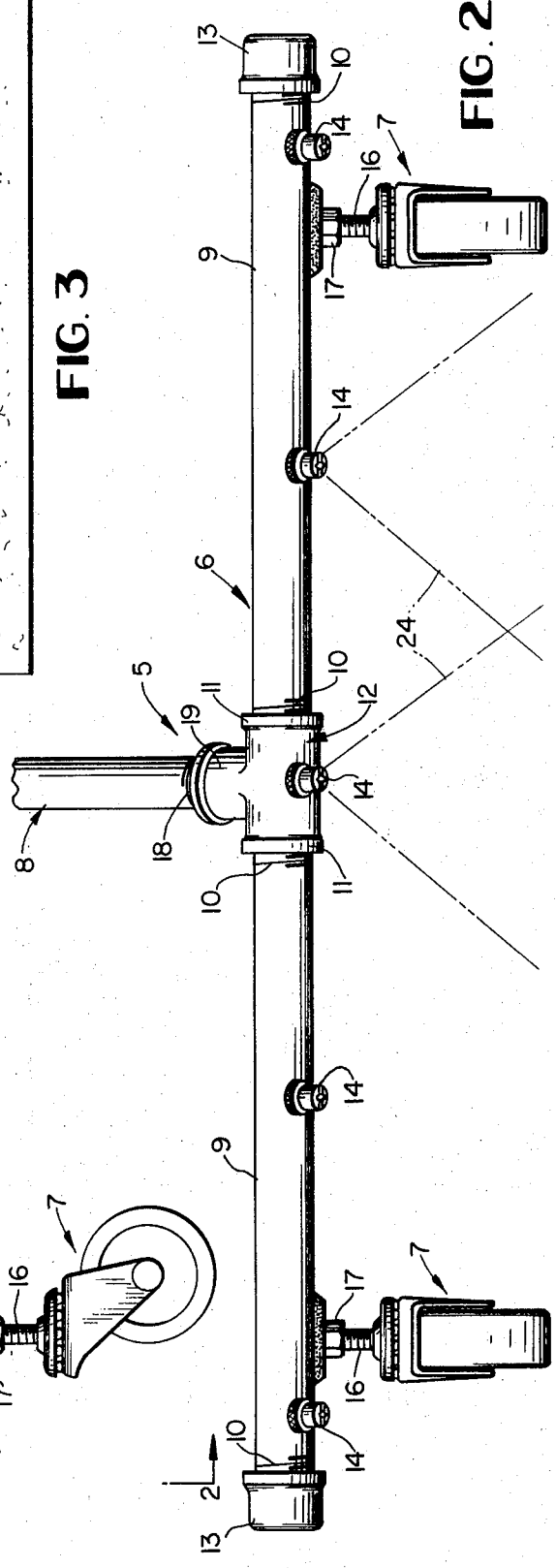
FIG. 3
FIG. 2

WATER SWEEP

SUMMARY

It is a primary object of the present invention to provide a device of extremely simple construction which may be effectively utilized with a conventional garden hose for quickly cleaning side-walks, driveways, service stations and other hard top surfaces with a minimum of manual effort.

Another object of the invention is to provide a sweep including a plurality of spray nozzles which are directed downwardly and forwardly and discharge sprays which overlap one another, and which can be propelled in a straight line with the row of nozzles disposed at an oblique angle, in either direction, relative to the direction of travel of the device, for sweeping debris from a path laterally to either side thereof.

Another object of the invention is to provide a sweep which may be very economically manufactured and sold and which will be extremely efficient and durable for its intended purpose.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a fragmentary side elevational view of the water sweep;

FIG. 2 is a fragmentary front elevational view thereof, and

FIG. 3 is a diagramatic view in top plan illustrating the water sweep in use.

DESCRIPTION OF THE PREFERRED EMBODIMENT

Referring more specifically to the drawing, the water sweep in its entirety is designated generally 5 and comprises a manifold 6 supported by a pair of caster wheels 7, and a tubular handle, designated generally 8.

The manifold 6 includes two corresponding pipes 9 having externally threaded ends 10. Adjacent ends of the pipes 9 are threaded into aligned ends 11 of a T-joint 12. Caps 13 threadedly engage and seal the remote ends of the pipes 9. Each pipe 9 is provided with two downwardly and forwardly directed nozzles 14 and the T-joint 12 is provided with an additional downwardly and forwardly directed nozzle 14. Arms or brackets 15 are welded or otherwise secured rigidly to the pipes 9 and extend transversely therefrom, adjacent their remote ends. Each caster wheel 7 has an upwardly extending threaded rod 16 which extends through a bracket 15 and which is adjustably secured thereto by nuts 17 which threadedly engage said rod 16 and bear against opposite sides of the bracket 15.

The handle 8 has a threaded end 18 which is threadedly secured in the transverse internally threaded end 19 of the T-joint 12, which extends from the manifold 6 in the same general direction as the brackets 15. The handle 8 has an opposite threaded end 20 to which is connected a conventional female hose coupling 21. The handle 8 is arcuately bent as seen at 22 near its threaded end 20 so that the handle portion between the bend 22 and coupling 21 constitutes a handgrip 23. The portion of the handle which extends from the T-joint 12 has its axis disposed in a plane coinciding with the plane of the axes of the nozzles 14.

The male outlet nipple, not shown, of a conventional garden hose is attached in a conventional manner to the fitting 21 so that water can be supplied under pressure through the hose to the handle 8 and from the handle 8 to the manifold 6. The water is discharged under pressure from the pipes 9 and joint 12 through the nozzles 14.

The handle 8 is preferably about four feet in length so that the operator standing in an upright position and grasping the handgrip 23 will hold the sweep 5 with the brackets 15 in substantially a horizontal plane, as seen in FIGS. 1 and 2. With the sweep 5 thus disposed, the nozzles 14 are directed downwardly and forwardly at an angle of approximately 40° to the surface on which the caster wheels 7 are supported and over which the sweep 5 is propelled in a direction from right to left of FIG. 1, by a pushing force exerted on the handle 8. The nozzles 14 are constructed to discharge diverging sprays each having an arc of approximately 80°, as indicated by the broken lines 24 in FIG. 2, so that the sprays from the adjacent nozzles overlap one another, and the five nozzles provide an unbroken spray of a width greater than the length of the manifold 6.

The caster wheels 7 are conventional and of a type capable of revolving through an arc of 360°. The caster wheels 7 permit the manifold 6 to be positioned at an oblique angle to a path of travel of the sweep, as illustrated in FIG. 3. The sweep 5 in its uppermost position of FIG. 3 is shown moving from left to right over a surface 25 and with the manifold 6 disposed at an oblique angle to the direction of travel of the sweep as indicated by the arrow 26, so that debris in the path over which the manifold 6 is moving will be deflected downwardly, as seen in FIG. 3. When the sweep reaches the right hand end of the surface 25, it makes substantially a U-turn to the right for travel in the opposite direction or from right to left, but with the manifold 6 inclined in the opposite direction relative to its path of travel, so that the debris will be deflected laterally from the path of travel in a direction away from the path previously cleaned by the sweep on its first movement from left to right across the surface 25. Provision of the caster wheels 7 permits the manifold 6 and handle 8 to be disposed at oblique angles to the direction of movement of the sweep so that this deflection of the debris to either side of the path of travel can be accomplished.

Obviously, the manifold 6 can be made longer to accommodate additional nozzles 14, and various other modifications and changes are contemplated and may be resorted to.

I claim as my invention:

1. A water sweep comprising a manifold, a tubular handle having one end connected to and communicating with the manifold, a fitting connected to the opposite end of said handle and adapted to be connected to the outlet end of a hose for supplying water under pressure through the handle to the manifold, caster wheels mounted for free swivelling movement about a vertical axis which is disposed behind said manifold, and nozzles connected to and opening from said manifold in a direction opposite to the direction from which the handle projects from the manifold.

2. A water sweep as in claim 1, brackets fixed to and extending from said manifold in a direction away from the nozzles and to which the caster wheels are connected for locating the caster wheels behind the manifold.

3. A water sweep as in claim 1, said handle being rigid and being curved adjacent the end thereof disposed remote from the manifold to provide a handgrip disposed adjacent said hose fitting and which is normally inclined downwardly and rearwardly.

4. A water sweep as in claim 1, said manifold comprising a T-joint, a pair of pipes having adjacent ends connected to the aligned ends of said T-joint, and caps closing and sealing the remote ends of said pipes.

5. A water sweep as in claim 4, said handle being connected to a tranverse branch of the T-joint.

6. A water sweep as in claim 5, at least two of said nozzles being connected to each of the pipes and one nozzle being connected to said T-joint, said nozzles providing overlapping diverging spray jets.

* * * * *